Nov. 21, 1967   J. W. PHILLIPS   3,353,559
SNAP ACTING PNEUMATIC DIVERTING RELAY
Filed May 18, 1965

INVENTOR
James W. Phillips
BY Anthony H. O'Brien
ATTORNEY

United States Patent Office 3,353,559
Patented Nov. 21, 1967

3,353,559
SNAP ACTING PNEUMATIC
DIVERTING RELAY
James W. Phillips, South Bend, Ind., assignor to Robertshaw Controls Company, Richmond, Va., a corporation of Delaware
Filed May 18, 1965, Ser. No. 456,775
6 Claims. (Cl. 137—625.66)

The present invention relates to pneumatic relays and in particular to pneumatic diverting relay for use in pneumatic control systems.

This invention is particularly adaptable for employment in pneumatic control systems for heating and/or air conditioning systems which utilize condition sensing elements to transmit pneumatic signals to a pneumatic controller.

An object of the present invention is to control the flow ports of a pneumatic relay with snap acting means in response to pneumatic signal variations.

Another object of the present invention is to actuate snap acting valve means between alternate controlling positions in response to pneumatic signals in a pneumatic relay.

This invention has another object in that the pneumatic flow through a pneumatic relay is diverted from one path to another path by snap acting means which may be adjusted for a particular pneumatic signal.

It is another object of the present invention to construct a relatively simple pneumatic relay with snap acting flow diverting means, in which the flow path may be reversed without changing the internal construction.

The present invention has a further object in that a diaphragm plunger assembly has adjustable biasing means for setting the point at which a signal pressure will operate a snap acting diverting valve in a pneumatic relay.

In practicing the present invention, a preferred embodiment includes a pneumatic relay casing having a pressure chamber and a flow chamber with port means communicating with the pressure chamber and a plurality of ports communicating with the flow chamber, snap acting valve means movably disposed in the flow chamber for controlling a flow between the plurality of ports and the flow chamber, actuating means for the snap acting valve means comprising spring biased plunge means, and diaphragm means covering the pressure chamber and acting in opposition to the plunger means.

Figure 1:
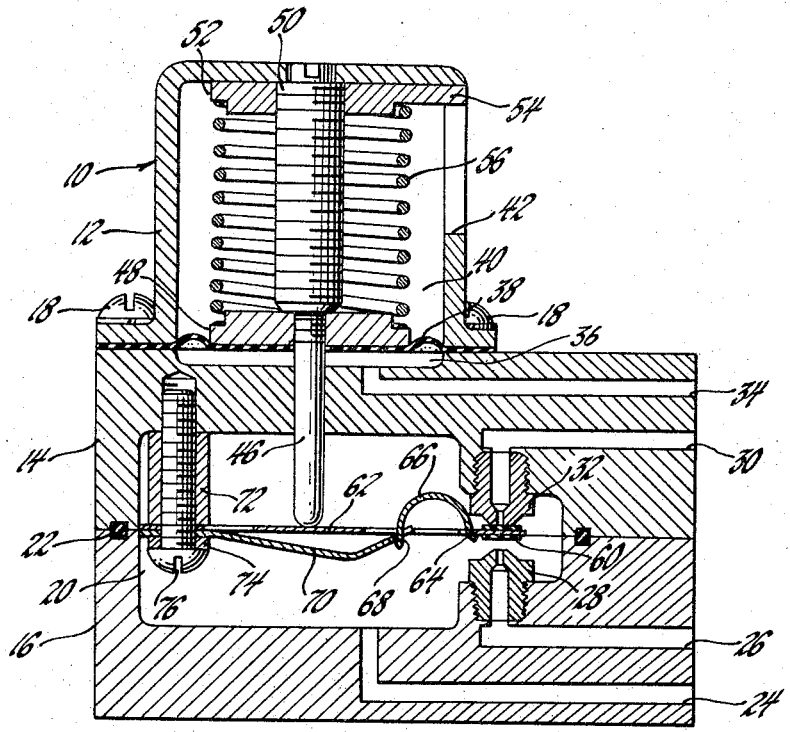
Figure 2:
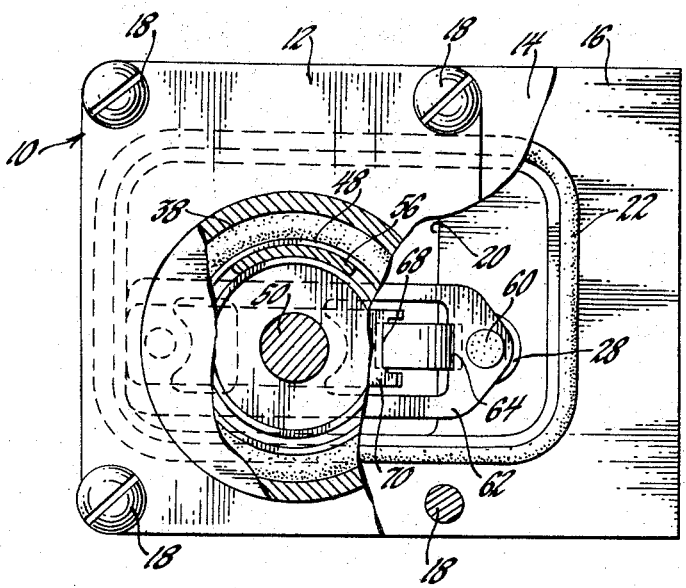

Other objects and advantages of the present invention will become apparent from the following description of a preferred embodiment, taken in connection with the accompanying drawing wherein:

FIG. 1 is a vertical cross section through a relay casing embodying the invention; and FIG. 2 is a top plan view of FIG. 1 with parts broken away and parts in section.

As is illustrated in FIG. 1, the present invention is embodied in a snap acting pneumatic relay casing, indicated generally at 10, having upper intermediate and lower sections 12, 14 and 16, respectively, which are secured together as by fastening screws 18. Mating portions of casing sections 14 and 16 are hollowed out to define a flow chamber 20, the periphery of which is sealed by an O-ring seal 22 disposed in mating recesses in the casing sections 14 and 16. Casing section 16 has two ports 24 and 26, with port 24 defining a common port communicating with flow chamber 20 and with port 26 defining a control port communicating with flow chamber 20 by means of a threaded fitting or nozzle 28. Casing section 14 also has two ports, with one port 30 defining a second control port communicating with flow chamber 20 by means of a threaded fitting or nozzle 32 and with the other port 34 defining a signal pressure port 34 communicating with a pressure chamber 36. The nozzles 28 and 32 terminate in spaced relationship to each other and face each other for a purpose to be described more fully hereinafter. The signal pressure chamber 36 is formed by a recess in the top wall of casing section 14, which is covered by a centrally apertured flexible diaphragm 38 having its periphery sealed between the adjacent portions of the casing sections 12 and 14 when secured by the screws 18. In the particular embodiment illustrated, the upper casing section 12 is cylindrical or cup-shaped with an annular flange forming the adjacent portion covering the diaphragm periphery The upper surface of the diaphragm 38 is subject to atmospheric pressure in the atmospheric pressure chamber 40 that is vented to the atmosphere by means of an elongated axial slot 42 in the cylindrical wall of the upper casing 12.

A back up plate 48 is centrally seated on the upper surface of the diaphragm 38 and has a centrally threaded bore which receives the threaded end of a rod 46 which slidably extends through the diaphragm 38 and the top wall of casing section 14 so that its other end is disposed in the flow chamber 20. Suitable seals such as O-rings (not shown) may be disposed around the rod 46 to prevent any leakage between the flow chamber 36. An adjusting shaft 50 is centrally threaded through a plate 52 and extends toward the back up plate 48; a radial arm 54 on the plate 52 extends through the slot 42 whereby the plate 52 is prevented from rotation but may be adjusted axially. A coil spring 56 encircles the adjusting shaft 50 and is mounted in compression between the plates 48 and 52. The adjusting shaft 50 has a reduced end portion disposed in an aperture in the top wall of casing section 12 so as to be available for adjustment purposes by a suitable tool. In this arrangement the plate 52 constitutes a fixed plate and the back up plate 48 constitutes a movable plate that correspondingly moves the rod 46 to actuate a snap acting valve means in the flow chamber 20.

As is shown in FIG. 1, a double faced valve member 60 oscillates with a snap action between the nozzles 28 and 30. The snap acting mechanism may be of any conventional type, such as is illustrated in FIGS. 14, 15 and 16 of U.S. Patent No. 2,458,518. In accordance with such construction, the double faced valve member 60 is mounted on the free end portion of a flexible blade 62 that has a generally rectangular cut out portion with a transverse edge defining a bearing edge 64 for a rolling spring 66. In assembled relation, the rolling spring 66 is compressed into a C-shaped configuration with its other end engaging a bearing edge 68 defined by the free end of a fixed support arm 70. The blade 62 and support 70 are superimposed with the support 70 having a bent free end so that the bearing edge 68 terminates in the cut out portion of the blade 62. The blade 62 and support 70 have contiguous fixed end portions mounted on a post 72 and being secured thereto by means of a lock washer 74 and threaded stud 76 that is threaded into a correspondingly threaded bore disposed in an internal wall casing section 14.

In operation of the above described, the ports of the pneumatic relay may be connected so that a branch line 24 is fed and exhausted by the two ports 26 and 30, or so that two branch ports 26 and 30 are alternately diverted to one supply line 24. However, for the purposes of description, it will be assumed that port 24 is a common supply line to be diverted to either one of two branch lines by means of ports 26 and 30.

With the elements of the pneumatic relay shown in their operating positions of FIG. 1, the signal pressure in pressure chamber 36 is at its maximum so that the back up plate 48 engages the end of the adjusting shaft 50 which thus limits the maximum pressure position of the diaphragm 38. During this time the pneumatic flow is traced from a supply source (not shown) through the common supply 24 and into the flow chamber 20, thence through the nozzle 28 and branch port 28 to a pneumatically operated control (not shown).

A signal pressure decrease in the chamber 36 causes the unitary movement of the back up plate 48, the diaphragm 38 and the plunger rod 46 in a downward direction (FIG. 1) under the bias of the coil spring 56. The end of rod 46 effects a downward movement of the blade 62 and when such downward force is sufficient to overcome the upward component of the force of rolling spring 66 on bearing edge 64, the valve member 60 moves with a snap action from nozzle 32 to nozzle 28 whereby port 26 is closed and port 30 is opened. The pneumatic flow is thus diverted from flow chamber 20 through the nozzle 32 and port 30 to another pneumatically operated control (not shown).

In the event the signal pressure in the chamber 36 increases, the resulting upward movement of the plunger rod 62 will reverse the operation of the snap acting mechanism and when the snap over point is reached the valve member 60 will be transferred with a snap action from nozzle 28 to nozzle 32.

In order to adjust the pneumatic relay to a particular signal pressure, the shaft 50 is rotated by any suitable tool. As the shaft 50 is rotated, the plate 52 operates as a travelling nut, i.e., because the plate arm 54 is confined within the casing slot 42 which defines abutment means, the plate 52 is prevented from rotating. The non-rotation of the plate 52 causes it to be moved axially on the threads of the adjusting shaft 52, thus the adjustment of the biasing force of coil spring 56 will determine the signal pressure in pressure chamber 36, at which the snap acting mechanism will operate. The operating differential, i.e., the difference in pressure at the point the rolling spring 66 snaps in one direction and the point the rolling spring 66 snaps in the other direction is inherent in the structure and force of the rolling spring 66.

While such terms as "upper" and "lower" have been utilized in designating certain elements of the pneumatic relay, it should be noted that such terms are merely for convenience of description. The simplified construction of the pneumatic relay permits the device to be mounted in any position without interferring with its operation.

Inasmuch as the preferred embodiment of the present invention is subject to many variations, modifications and changes in detail, it is intended that all matter contained in the foregoing description or shown on the accompanying drawing shall be interpreted as illustrative and not in a limiting sense.

What is claimed is:
1. In a snap acting pneumatic relay, the combination comprising
   a casing having a pressure chamber and a flow chamber,
   means defining a wall of said casing separating said pressure and flow chambers so that said pressure chamber may be subject to pneumatic pressure independently of pressure in said flow chamber,
   a signal pressure port communicating with said pressure chamber,
   a common port communicating with said flow chamber,
   a pair of branch ports communicating with said flow chamber,
   valve means movably disposed in said flow chamber for alternate control of said pair of branch ports,
   snap acting means operative to move said valve means,
   a plunger rod slidably extending through the wall of said casing between said pressure chamber and said flow chamber with one end engaging said snap acting means,
   a diaphragm element connected to an opposite end of said plunger rod and defining a movable wall of said pressure chamber for moving said plunger rod in response to signal pressures in said pressure chamber,
   a first plate element fixed to said diaphragm element and said plunger rod for unitary movement therewith,
   a second plate element spaced from said first plate element,
   resilient means between said first and second plate elements for biasing said second plate element in opposition to signal pressures in said pressure chamber, and
   means for adjusting said resilient means to select a set point for operation of said valve means by said snap acting means.

2. The combination as recited in claim 1 wherein said adjusting means comprises a shaft threaded through said second plate element and means to move said second plate element toward and away from said first plate element in response to rotation of said shaft.

3. The combination as recited in claim 2 wherein said means to move said second plate element comprises a radial arm on said second plate element and abutment means on said casing engaged by said radial arm.

4. The combination as recited in claim 3 wherein said shaft has an end portion disposed adjacent said first plate element to define a stop element therefor.

5. A snap acting pneumatic relay comprising
   a casing having upper, intermediate and lower sections fastened together,
   hollowed out mating portions on said intermediate and lower sections defining a flow chamber,
   a recessed portion on said intermediate section adjacent said upper section,
   diaphragm means covering said recessed portion to define a pressure chamber,
   a signal pressure port in said intermediate section communicating with said pressure chamber whereby a signal pressure force is exerted on said diaphragm means,
   a back up plate on said diaphragm means,
   an operating rod slidably extending through said intermediate section with one end disposed in said flow chamber and another end connected to said back up plate whereby said diaphragm means, said back up plate and said operating rod move as a unit,
   a rotatable adjusting shaft in said upper section having one end extending toward said back up plate,
   a retainer plate having a centrally threaded aperture receiving the other end of said adjusting shaft,
   resilient means between said retainer plate and said back up plate whereby a biasing force is exerted on said diaphragm means in opposition to the signal pressure force,
   an operative connection between said retainer plate and said upper section whereby rotation of said adjusting shaft causes axial displacement of said retainer plate to adjust the biasing force on said diaphragm means,
   a common flow port in said lower section communicating with said flow chamber,
   a first branch flow port in said lower section having a nozzle opening into said flow chamber,
   a second branch flow port in said intermediate section having a nozzle opening into said flow chamber in spaced opposed relation to said first branch flow port, a double faced value member disposed for movement between said first and second branch ports, snap acting means operatively connected between the said one end of said operating rod and said valve member whereby said valve member is moved with a snap action for alternate control of said first and second branch flow ports in response to variations of the signal pressure force in said pressure chamber.

6. The combination as recited in claim 5 wherein said operative connection comprises slot means in said upper section and an arm on said retainer plate whereby the retainer plate is prevented from rotation.

References Cited

UNITED STATES PATENTS

| | | | |
|---|---|---|---|
| 2,339,753 | 1/1944 | Bloom | 137—488 X |
| 2,458,518 | 1/1949 | Kohl | 200—67 |
| 2,663,122 | 12/1953 | Cornelius | 137—505.14 X |
| 2,984,252 | 5/1961 | Bryant | 137—505.42 X |
| 3,030,778 | 4/1962 | Taylor | 137—625.66 X |

M. CARY NELSON, *Primary Examiner.*

R. J. MILLER, *Assistant Examiner.*